(12) United States Patent
Takamatsu et al.

(10) Patent No.: US 11,697,416 B2
(45) Date of Patent: Jul. 11, 2023

(54) TRAVEL ASSISTANCE METHOD AND TRAVEL ASSISTANCE DEVICE

(71) Applicant: Nissan Motor Co., Ltd., Yokohama (JP)

(72) Inventors: Yoshiro Takamatsu, Kanagawa (JP); Yohei Mishina, Kanagawa (JP); Takato Kurokawa, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 449 days.

(21) Appl. No.: 16/973,829

(22) PCT Filed: Jun. 13, 2018

(86) PCT No.: PCT/IB2018/001052

§ 371 (c)(1),
(2) Date: Dec. 10, 2020

(87) PCT Pub. No.: WO2019/239179

PCT Pub. Date: Dec. 19, 2019

(65) Prior Publication Data

US 2021/0253104 A1   Aug. 19, 2021

(51) Int. Cl.
*B60W 30/10* (2006.01)
*B60W 30/18* (2012.01)
*B60W 60/00* (2020.01)

(52) U.S. Cl.
CPC ... *B60W 30/18163* (2013.01); *B60W 2520/10* (2013.01); *B60W 2552/05* (2020.02);
(Continued)

(58) Field of Classification Search
CPC ....... B60W 30/18163; B60W 2520/10; B60W 2552/05; B60W 2554/4041;
(Continued)

(56) References Cited

U.S. PATENT DOCUMENTS

2015/0360684 A1    12/2015  Matsuno et al.
2015/0375748 A1*   12/2015  Nagase ............. B60W 30/0953
                                                        701/41
(Continued)

FOREIGN PATENT DOCUMENTS

EP            2955077 A1    12/2015
JP        2009-248892 A     10/2009
(Continued)

*Primary Examiner* — Abby Y Lin
*Assistant Examiner* — Hossam M Abd El Latif
(74) *Attorney, Agent, or Firm* — Young Basile Hanlon & MacFarlane, P.C.

(57) ABSTRACT

A vehicle travel assistance method executed by a processor comprises: setting a travel lane in which a subject vehicle travels based on detection information of a sensor equipped in the subject vehicle, identifying a preceding vehicle traveling ahead of a subject vehicle based on detection information of a sensor, calculating, based on the detection information, a first evaluation value indicating a possibility that the subject vehicle can return to the travel lane from an adjacent lane adjacent to the travel lane after overtaking the preceding vehicle, calculating a shortening width of travel time shortened by overtaking the preceding vehicle based on the vehicle speed of the subject vehicle and the vehicle speed of the preceding vehicle, and determining whether or not to overtake the preceding vehicle based on the first evaluation value and the shortening width.

15 Claims, 4 Drawing Sheets

(52) U.S. Cl.
CPC ............... *B60W 2554/4041* (2020.02); *B60W 2554/4042* (2020.02)

(58) Field of Classification Search
CPC ..... B60W 2554/4042; B60W 60/0021; B60W 30/10; B60W 2554/803; B60W 2554/802; B60W 50/0097; B60W 30/143
USPC .......................................................... 701/25
See application file for complete search history.

(56) References Cited

U.S. PATENT DOCUMENTS

| | | | |
|---|---|---|---|
| 2017/0017239 A1* | 1/2017 | Kanai | G08G 1/207 |
| 2018/0033309 A1* | 2/2018 | Norwood | B62D 15/029 |
| 2019/0047561 A1* | 2/2019 | Nishiguchi | B60W 50/14 |

FOREIGN PATENT DOCUMENTS

| | | |
|---|---|---|
| JP | 2015-152386 A | 8/2015 |
| JP | 2015-168406 A | 9/2015 |
| JP | 2016-4443 A | 1/2016 |
| JP | 2016-16829 A | 2/2016 |
| JP | 2018-049445 A | 3/2018 |

* cited by examiner

TRAVEL ASSISTANCE METHOD AND TRAVEL ASSISTANCE DEVICE

TECHNICAL FIELD

The present invention relates to a travel assistance method and a travel assistance device for assisting a traveling of a vehicle.

BACKGROUND

Conventionally, as a driving assistance device for overtaking control, the following driving assistance device has been known (for example, JP2016-016829A). When a subject vehicle A changes lane to overtake a preceding vehicle B, a driving assistance control unit 11 checks whether or not a congestion vehicle has been detected in front of the preceding vehicle B, and if detected, sets a congestion evaluation value based on the relationship between the subject vehicle A and the preceding vehicle B and the congestion vehicle. The driving assistance control unit 11 compares the congestion evaluation value with an evaluation threshold, and determines that the lane is congested when the congestion evaluation value exceeds the evaluation threshold. When a determination is made that the lane is congested, the diving assistance control unit 11 checks whether or not a necessary distance for allowing the subject vehicle A to enter the front of the preceding vehicle B is secured, and when the necessary distance is not secured, executes a lane return deceleration control for returning the subject vehicle A to the rear of the preceding vehicle B after the overtaking control is interrupted.

SUMMARY

However, in the prior art, since the overtaking is executed regardless of the time that can be shortened by the overtaking, there is a possibility that the unnecessary overtaking is executed.

The problem to be solved by the present invention is to provide a travel assistance method and a travel assistance device that can prevent unnecessary overtaking from being executed.

The present invention solves the above problem through identifying a preceding vehicle traveling ahead of a subject vehicle based on detection information of a sensor equipped in the subject vehicle, calculating, based on the detection information, a first evaluation value indicating a possibility that the subject vehicle can return to a travel lane from an adjacent lane after overtaking the preceding vehicle, calculating a shortening width of a travel time shortened by overtaking the preceding vehicle based on a vehicle speed of the subject vehicle and a vehicle speed of the preceding vehicle, and determining whether or not to overtake the preceding vehicle based on the first evaluation value and the shortening width.

According to the present invention, unnecessary overtaking can be prevented from being executed.

BRIEF DESCRIPTION OF THE DRAWING(S)

DETAILED DESCRIPTION

Hereinafter, one or more embodiments of the present invention will be described with reference to the drawings. In one or more embodiment of the present invention, an example will be described in which the present invention is applied to a driving control system including a travel assistance device for assisting traveling of a vehicle according to the present invention.

Figure 1:
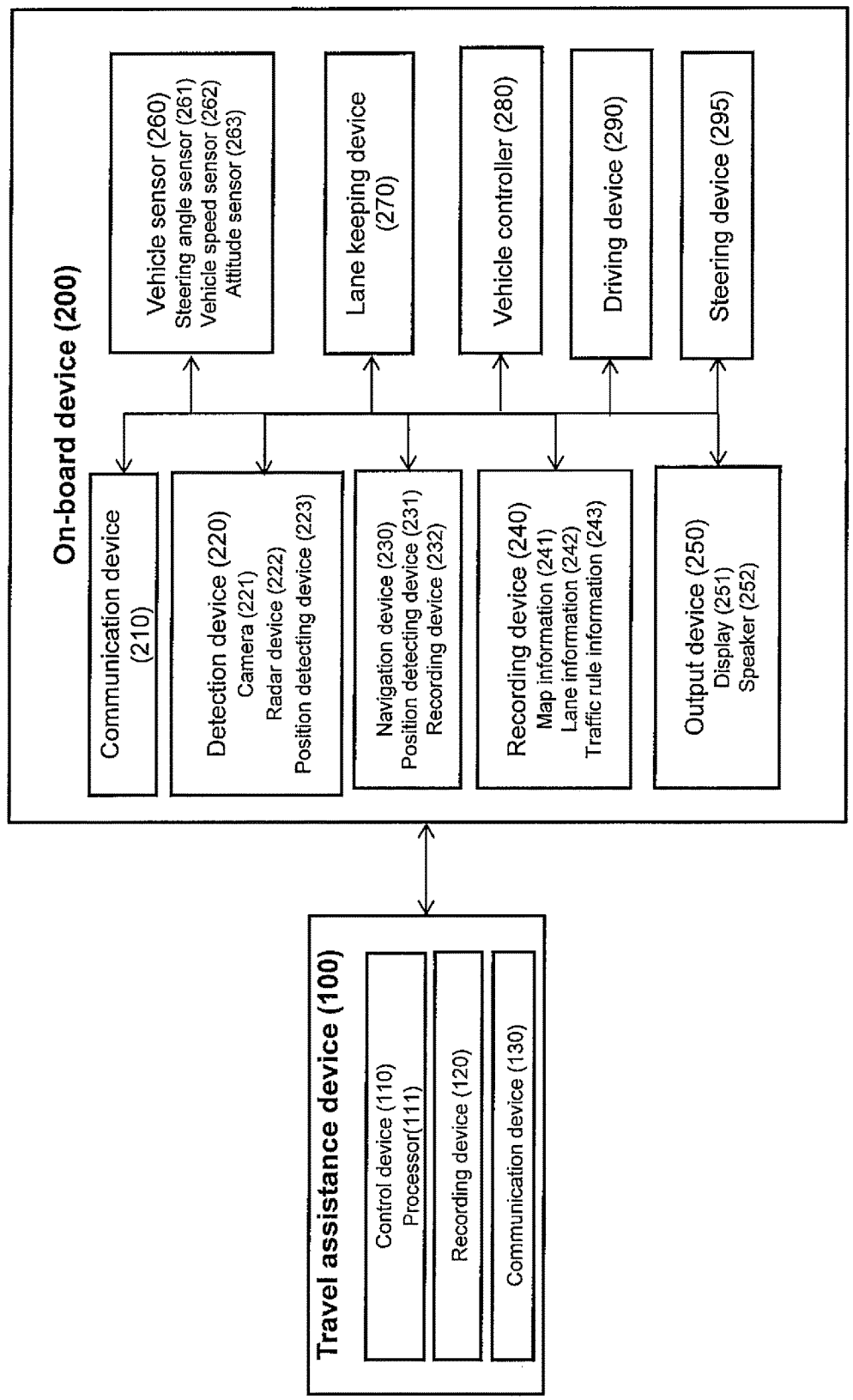
FIG. 1 is a block diagram of a driving control system including a travel assistance device according to the present embodiment.

FIG. 1 is a diagram showing a block configuration of a driving control system 1. The driving control system 1 according to one or more embodiment of the present invention includes a travel assistance device 100 and an onboard device 200.

The travel assistance device 100 may be configured as hardware integrated with the onboard device 200, or may be configured to be distributed as separate device from the onboard device 200.

In this example, the driving control system will be described as an example in which the travel assistance device 100 is configured to exchange information and cooperate with the onboard device 200 equipped in a vehicle via a communication device 130. The driving control system performs automatic driving that does not require any operation by a driver, or performs automatic driving that requires some operation by the driver. The driving by the driving control system is executed according to traffic regulations of each country.

The travel assistance device will then be described. The travel assistance device 100 includes a control device 110, a recording device 120, and a communication device 130. The control device 110 includes a processor 111 that executes a control process for assisting travel of the subject vehicle, such as overtaking of the preceding vehicle. The processor 111 is an information processing device having an information processing function for performing a control process required to assist travel of the subject vehicle. The processor 111 is a computer including a ROM (Read Only Memory) in which is stored a program for determining whether or not to overtake the preceding vehicle and executing a process of controlling travel assistance based on the determination result, a CPU (Central Processing Unit) as an operation circuit functioning as the control device 110 by executing the program stored in the ROM, and a RAM (Random Access Memory) functioning as an accessible recording device. The control device 110 according to one or more embodiments of the present invention executes each function by cooperation of software for realizing the above functions and the above-described hardware. The control device 110 and the recording device 120 can exchange information with each other via a wired or wireless communication line. The communication device 130 can exchange information with the onboard device 200.

The recording device 120 stores map data necessary for calculation processing of a travel route of the subject vehicle and/or driving control processing of the subject vehicle. The communication device 130 sends and receives signals to and from the communication device 210 included in the onboard device 200. The travel assistance device 100 acquires information processed by the onboard device 200 and information stored in the onboard device 200 using the communication device 130.

The onboard device 200 will be described.

The onboard device 200 acquires detection information about the subject vehicle and the situation around the subject vehicle, and drives the subject vehicle based on a command from the travel assistance device 100.

The onboard device 200 according to one or more embodiment of the present invention includes a communication device 210, a detection device 220, a navigation device 230, a recording device 240, an output device 250, a vehicle sensor 260, a lane keeping device 270, a vehicle controller 280, a driving device 290, and a steering device 295.

The communication device 210 according to one or more embodiment of the present invention executes communication with each device of the onboard device 200 and the external server 300. The devices constituting the onboard device 200 are connected to each other by a CAN (Controller Area Network) or other onboard LAN (communication device 210) in order to exchange information with each other. The onboard device 200 can exchange information with the travel assistance device 100 via the onboard LAN 210. The onboard device 200 may exchange information with an external server via the communication device 210 that performs wireless communication.

The detection device 220 acquires detection information about the surroundings of the subject vehicle traveling on the route. The detection device 220 of the vehicle recognizes the presence and location of the travel lane in which the vehicle moves, and detects the presence and the position of the object including the obstacle existing around the subject vehicle. The detection device 220 detects a road condition of a travel lane in which the subject vehicle is traveling and a road condition of an adjacent lane adjacent to the travel lane. The road condition is a road structure, the position of the traveling vehicle, the vehicle speed of the traveling vehicle, and the like. In the following description, although not particularly limited, the detection device 220 includes a camera 221. The camera 221 is an imaging device including an image sensor such as a CCD, for example. The camera 221 may be an infrared camera or a stereo camera. The camera 221 is installed at a predetermined position of the vehicle, and captures a lane mark of a travel lane of the vehicle and an object around the vehicle. The periphery of the vehicle includes a front, a rear, a front side, and a rear side of the vehicle. Objects include two-dimensional signs such as lane marks, stop lines, etc. marked on the road surface. The objects comprise three-dimensional objects. The objects include stationary objects, such as signs. Objects include moving objects such as pedestrians, motorcycles, and automobiles (other vehicles). Objects include road structures including median strip such as guardrails and curbs, signals, signs, and display devices.

The detection device 220 according to one or more embodiments of the present invention analyzes an image data, and recognizes a presence and position of the travel lane in which the subject vehicle travels and the adjacent lane near the travel lane based on the analysis result. In addition, the detection device 220 recognizes the presence and position of vehicles traveling in the travel lane and vehicles traveling in the adjacent lane near the travel lane. The detection device 220 recognizes the presence or absence, position, and type of lane marks of the travel lane and/or the adjacent lane. The detection device 220 recognizes the presence, position, and type of the object. In the following description, the travel lane indicates a lane in which the subject vehicle is traveling, and the adjacent lane is a lane adjacent to the travel lane.

The detection device 220 comprises a radar device 222. As the radar device 222, a system such as a millimeter wave radar, a laser radar, an ultrasonic radar, a laser range finder, or the like known at the time of application can be used. The detection device 220 detects the presence or absence of the object, the position of the object, and the distance to the object based on a received signal of the radar device 222. The detection device 220 detects the presence or absence of the object, the position of the object, and the distance to the object based on the clustering result of point cloud information acquired by the laser radar.

In addition, if the communication device 210 can perform vehicle-to-vehicle communication between another vehicle and the subject vehicle, the detection device 220 may acquire detection information of the other vehicle. Of course, the detection device 220 may acquire information by so-called road-to-vehicle communication, and may acquire information on a road including the travel lane and the adjacent lane as detection information from an external device of the Intelligent Transport Systems (ITS) via the communication device 210, for example. The detection device 220 may acquire the information of the vicinity of the vehicle by the onboard detection device 220, and may acquire the information of a region far from the vehicle by a predetermined distance or more from an external device installed on the road side via the communication device 210.

The detection device 220 may include a position detection device 223. In this example, the detection result of the position detection device 231 included in the navigation device 230 is acquired.

The detection device 220 sequentially outputs the detection result to the processor 11.

The navigation device 230 calculates a route from the current position of the vehicle to the destination using a method known at the time of filing. The calculated route is transmitted to the travel assistance device 100 and/or the vehicle controller 280 for use in driving control of the vehicle. The calculated route is also output as route guidance information via the output device 250, which will be described later. The navigation device 230 includes a position detection device 231. The position detection device 231 comprises a receiver of a Global Positioning System (GPS), and detects the travel position (latitude, longitude, and map coordinate values) of the traveling vehicle. The current position information is transmitted to the processor 11 as detection information.

The navigation device 230 accesses the recording device 240, and refers to a map information 241, a lane information 242, and a traffic rule information 243. The navigation device 230 specifies a travel lane in which the vehicle travels based on the current position of the vehicle detected by the position detection device 231. The travel lane may be a part of a route to a destination specified by a user, or may be a part of a route to a destination estimated based on a travel history of the vehicle/user. The navigation device 230 specifies a travel lane in which the vehicle travels with reference to map information 241 and the like, which will be described later.

The output device 250 includes a display 251 and a speaker 252. The output device 250 outputs various types of information relating to the driving control to the user or the occupant of the surrounding vehicle. The output device 250 outputs the amount of deviation between the travel lane and the lane of the map information 241, contents of the map information modification, a planned driving action plan, and information on the driving control based on a driving action plan. The output device 250 may output various types of information relating to the driving control to an external device such as an intelligent transport system via a communication device.

The vehicle sensor 260 includes a steering angle sensor 261, a vehicle speed sensor 262, and an attitude sensor 263. The steering angle sensor 261 detects information such as a steering amount, a steering speed, and a steering acceleration, and outputs the information to the vehicle controller 280. The vehicle speed sensor 262 detects the speed and/or acceleration of the vehicle and outputs the speed and/or acceleration of the vehicle to the vehicle controller 280. The attitude sensor 263 detects the position of the vehicle, the pitch angle of the vehicle, and the roll angle of the vehicle, and the yaw angle of the vehicle, and outputs them to the vehicle controller 280. The attitude sensor 263 includes a gyro sensor.

The lane keeping device 270 detects the travel lane from a captured image of the camera 221. The lane keeping device 270 has a lane departure prevention function (lane keeping support function) for controlling the movement of the vehicle to keep a predetermined relationship between the position of the lane mark of the lane and the position of the vehicle. The travel assistance device 100 controls the movement of the vehicle so that the vehicle travels in the center of the lane. The lane mark is not limited as long as the lane mark has a function of defining a lane, and may be a diagram drawn on a road surface, may be a planting existing between lanes, or may be a road structure such as a guardrail, curbstone, separation band, pedestrian road, or motorcycle road existing on the shoulder side of the lane. The lane mark may be a stationary object such as a signboard, a sign, a store, a street tree, or the like existing on the shoulder side of the lane. As will be described later, when the travel assistance device 100 determines to execute the overtaking of the preceding vehicle, the lane keeping device releases the lane keeping.

The vehicle controller 280 according to one or more embodiment of the present invention executes the driving control of the vehicle according to the driving plan planned by the processor 111. The vehicle controller 280 operates the vehicle sensor 260, the driving device 290, and the steering device 295. The vehicle controller 280 acquires vehicle information from the vehicle sensor 260. The vehicle controller 280 according to one or more embodiment of the present invention is an onboard computer such as an Electric Control Unit (ECU), and electronically controls the driving/operation of the vehicle. Examples of the vehicle include an electric vehicle having an electric motor as a traveling drive source, an engine vehicle having an internal combustion engine as a traveling drive source, and a hybrid vehicle having both an electric motor and an internal combustion engine as a traveling drive source. Examples of the electric car or hybrid car having an electric motor as the traveling drive source include those of a type in which the power source for the electric motor is a secondary battery and a type in which the power source for the electric motor is a fuel cell.

The driving device 290 according to one or more embodiment of the present invention includes a driving mechanism of the vehicle. The driving mechanism includes an electric motor and/or an internal combustion engine as the above-mentioned traveling drive sources, a power transmission device including a drive shaft and an automatic transmission for transmitting the output from the traveling drive sources to the driving wheels, a braking device 271 for braking the wheels, and the like. The driving device 290 generates respective control signals of these driving mechanisms based on input signals by accelerator operation and brake operation and control signals acquired from the vehicle controller 280, and executes driving control including acceleration and deceleration of the vehicle. By sending the control information to the driving device 290, the driving control including acceleration and deceleration of the vehicle can be automatically performed. In the case of a hybrid car, a ratio of the torque output to the electric motor and the torque output to the internal-combustion engine according to the traveling state of the vehicle is also transmitted to the driving device 290.

The steering device 295 according to one or more embodiment of the present invention includes a steering actuator. The steering actuator includes a motor or the like attached to a column shaft of a steering. The steering device 295 performs control for changing the traveling direction of the vehicle based on the control signal acquired from the vehicle controller 280 or the input signal by the steering operation. The vehicle controller 280 transmits control information including the steering amount to the steering device 295, thereby executing the change control of the traveling direction. The control of the driving device 290 and the control of the steering device 295 may be performed completely automatically, or may be performed in a manner to assist the driving operation of the driver. The control of the driving device 290 and the control of the steering device 295 can be interrupted/stopped by an interventional operation of the driver.

Figure 2:
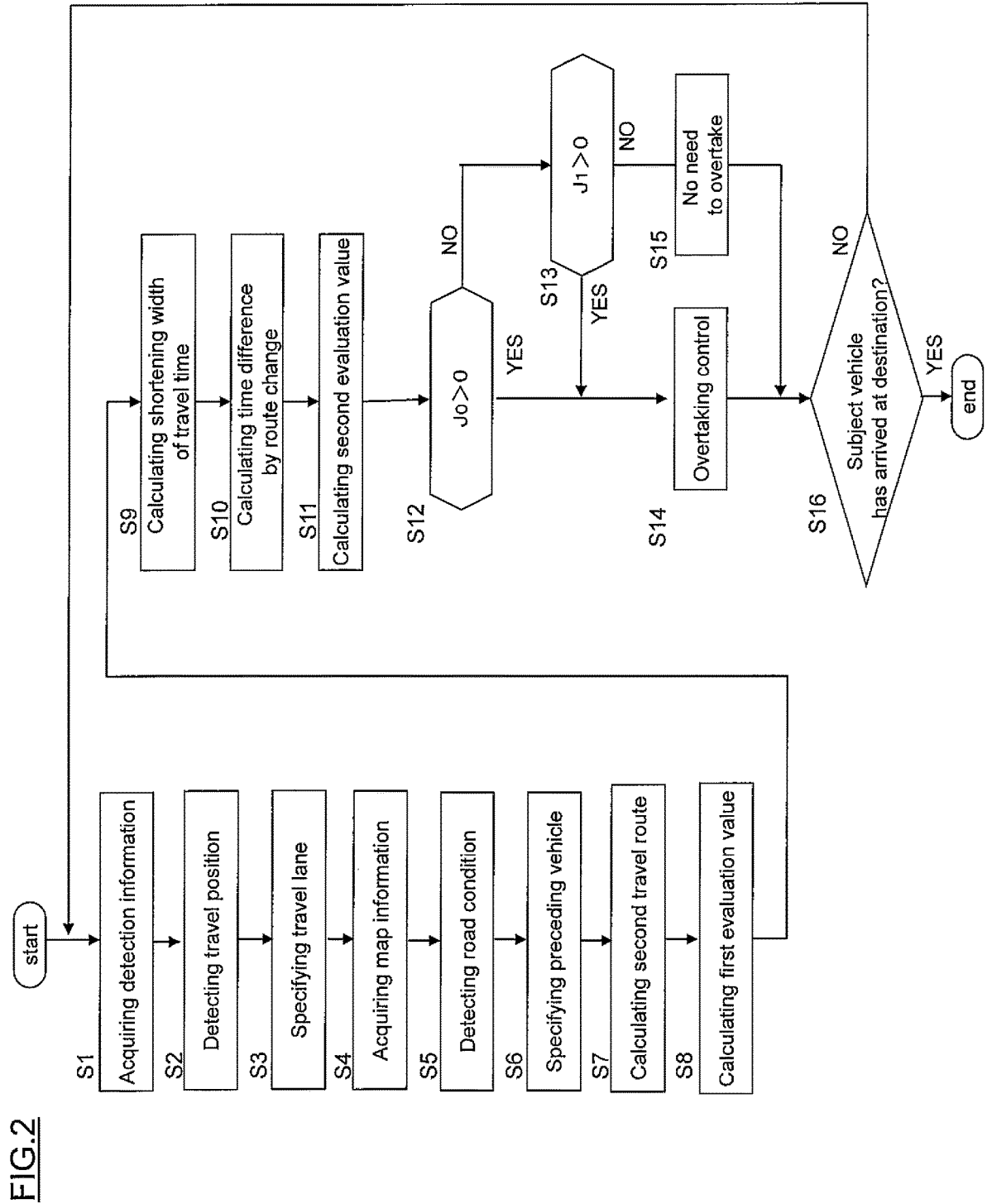
FIG. 2 is a flowchart showing a control procedure of the driving control system of the present embodiment.
Figure 3:
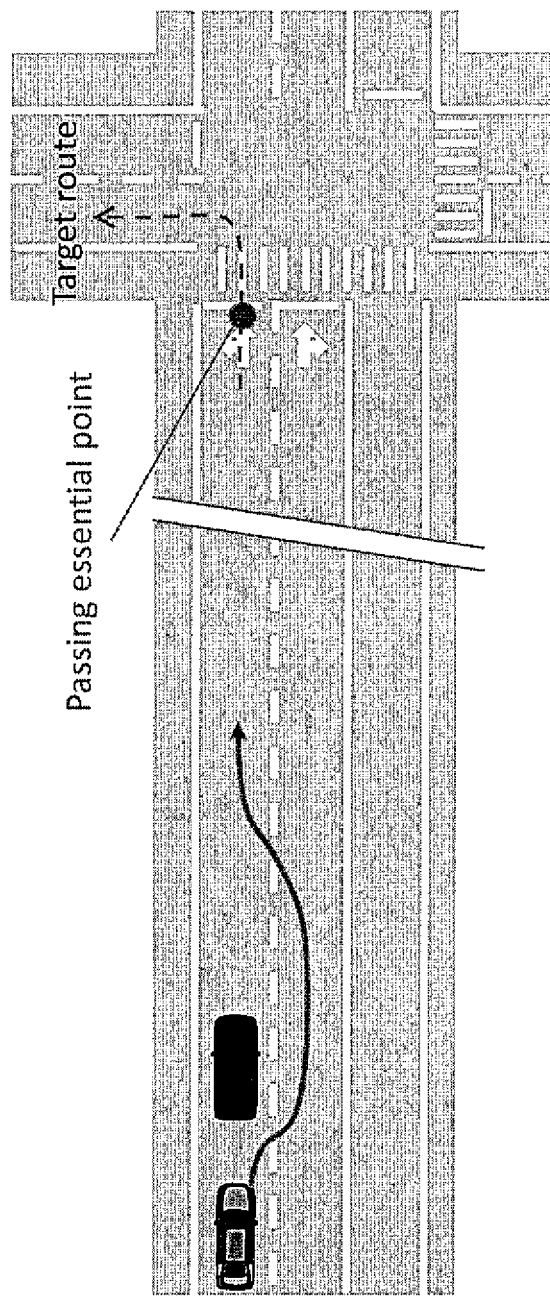
FIG. 3 is a diagram for explaining a scene in which a vehicle overtakes a preceding vehicle.
Figure 4:
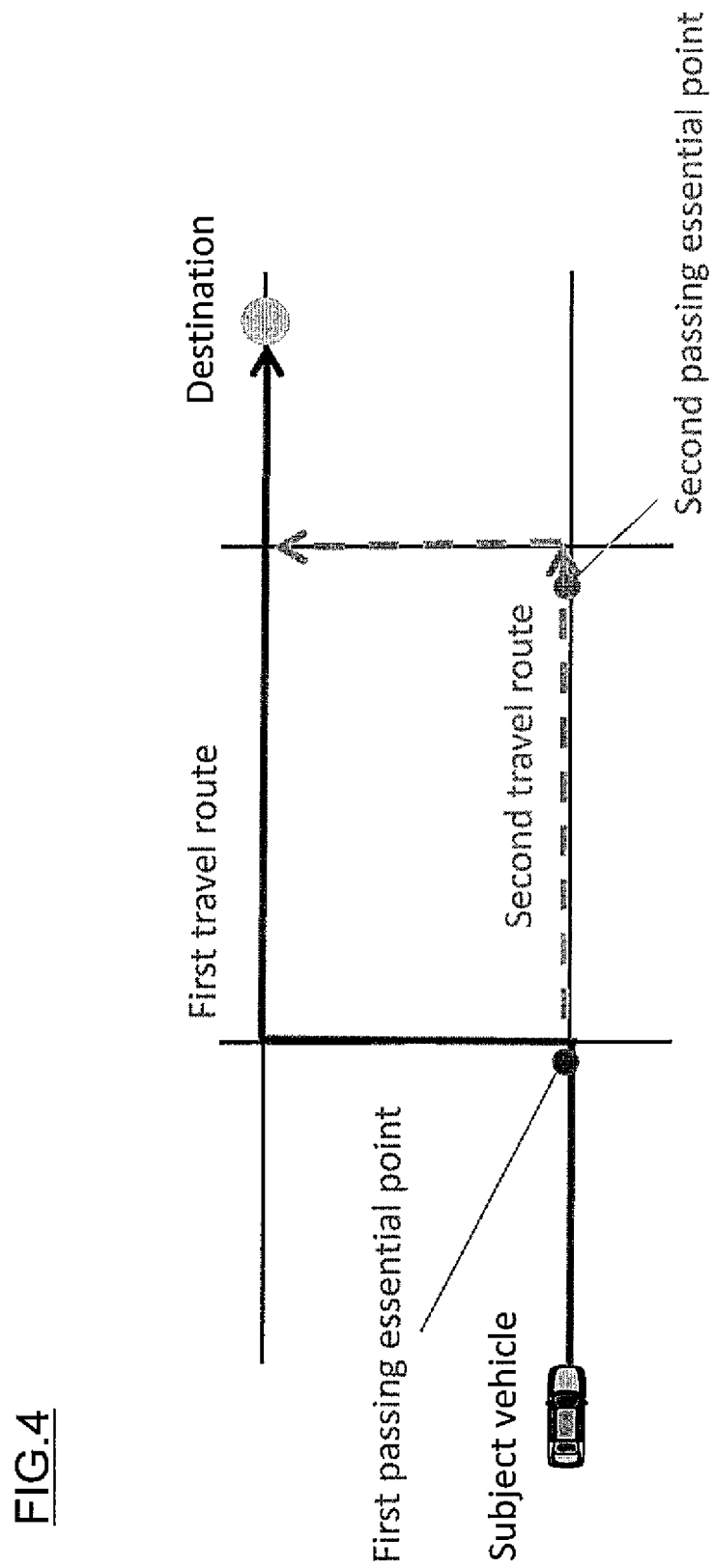
FIG. 4 is a diagram for explaining a travel route set for the subject vehicle to arrive at a destination.

Next, a control flow of the travel assistance device 100 will be described with reference to FIGS. 2 to 4. FIG. 2 is a flowchart showing a control flow of the travel assistance device 100. FIG. 3 is a diagram for explaining a scene in which the subject vehicle overtakes the preceding vehicle. FIG. 4 is a diagram for explaining a travel route set for the subject vehicle to arrive at a destination. Note that on the page of FIG. 4, the upside is north.

The travel assistance device 100 determines whether or not to execute the overtaking of the preceding vehicle in a scene in which the preceding vehicle is traveling ahead of the subject vehicle, and executes control processing described below in order to execute overtaking control based on the determination result. The travel assistance device 100 executes the following control flow at a timing when, for example, the vehicle speed of the preceding vehicle is equal to or lower than a predetermined vehicle speed and this state continues for a predetermined period of time or longer. Alternatively, the travel assistance device 100 executes the following control flow at a timing when, for example, the subject vehicle approaches the preceding vehicle and the distance between the subject vehicle and the preceding vehicle becomes equal to or less than a predetermined distance. In executing the control flow, the control device 100 acquires a travel route from the current position of the subject vehicle to the destination (hereinafter, referred to as a first travel route) from the navigation device 230, and executes automatic driving control so that the subject vehicle travels along the calculated travel route. The control device 110 may execute the following control flow when the automatic driving control is not executed.

In step S1, the control device 110 of the travel assistance device 100 acquires detection information detected by the detection device 220 of the onboard device 200. The detection information includes at least information on the front of the vehicle. For example, the detection information includes information up to several hundred meters ahead of the subject vehicle on the travel lane of the subject vehicle. When there is an adjacent lane next to the travel lane, the detection information also includes information on the adjacent lane.

In step S2, the control device 110 specifies the road shape (road structure) of the road in which the subject vehicle is currently traveling based on the detection information of the onboard device 200, and detects the position at which the subject vehicle is currently traveling according to the specified road shape. The control device 110 may detect the traveling position of the subject vehicle using the detection information detected by the position detection device 223 or the position detection device 231.

In step S3, the control device 110 specifies a travel lane in which the subject vehicle is currently traveling. The control device 110 specifies the number of lanes and the shape of the lanes in which the subject vehicle is currently traveling based on the detection information of the onboard device 200. Then, the control device 110 specifies which lane the subject vehicle is traveling in among the one or more lanes specified by using the traveling position of the subject vehicle. In the example of FIG. 3, the control device 110 identifies that the subject vehicle is traveling in the leftmost lane on the road with the two lanes roads on each side. The control device 110 may specify the travel lane based on the lane information recorded in the recording device 240 and the traveling position of the subject vehicle.

In step S4, the control device 110 acquires the map information 241 from the recording device 240.

In step S5, the control device 110 detects a road condition ahead of the subject vehicle. The control device 110 detects, as the road condition, the relative positional relationship of the other vehicle relative to the road shape specified in the control process of step S2. The other vehicle is a vehicle that travels or stops in a travel lane and/or an adjacent lane.

For example, as shown in FIG. 3, it is assumed that a road with two lanes on each side in a straight line shape is connected to an intersection, and the subject vehicle is traveling about 100 m to the intersection. At this time, the control device 100 detects a road condition including an area from the subject vehicle to the intersection in front of the subject vehicle.

In the example of FIG. 3, it is assumed that when the traffic signal at the intersection is red and the travel route to the destination of the subject vehicle is a route in which the subject vehicle turns left at the intersection, a plurality of other vehicles stopped in line in the travel lane in order to make a left turn. In such a situation, the control device 110 detects, as the road condition, the positions of the plurality of other vehicles stopped in line in the travel lane, and thereby can specify the positions of the plurality of other vehicles stopped in line in the travel lane and the distance from the other vehicle stopped at the end of the line to the subject vehicle. Further, when the other vehicle is traveling between the other vehicle stopped at the end of the line and the subject vehicle, the control device 100 can specify the other vehicle traveling from the detected road condition.

In another example of FIG. 3, it is assumed that the traffic signal of the intersection is blue, the other vehicle stops in the intersection for turning right, and a plurality of vehicles are stopped in line behind the other vehicle waiting for turning right. In such a situation, the control device 110 detects, as the road condition, the positions of the plurality of other vehicles stopped in line in the adjacent lane, and thereby can specify the positions of the plurality of other vehicles stopped in line in the adjacent lane and the distance from the other vehicle stopped at the end of the line to the subject vehicle. Further, when the other vehicle is traveling between the other vehicle stopped at the end of the line and the subject vehicle, the control device 100 can specify the other vehicle traveling from the detected road condition.

In step S6, the control device 110 identifies the preceding vehicle based on the road condition. The preceding vehicle is a vehicle traveling ahead of the subject vehicle on the travel lane.

In step S7, the control device 110 uses the navigation device 230 to calculate a second travel route based on the map information 241. The second travel route is a route different from the first travel route, and is a route for the subject vehicle to arrive at the destination when the subject vehicle cannot return from the adjacent lane to the travel lane by the time the subject vehicle arrives at a predetermined target point after overtaking the preceding vehicle. When calculating the second travel route, the control device 110 sets a passing essential point on the second travel route.

The relationship between the first travel route and the second travel route will be described with reference to FIG. 4. At present, the subject vehicle is traveling from the west to the east toward the intersection including the first passing essential point. The first travel route is a route in which the subject vehicle makes a left turn from east to north at an intersection including the first passing essential point. If the subject vehicle cannot return from the adjacent lane to the travel lane by the time the subject vehicle passes the first passing essential point after overtaking the preceding vehicle, the subject vehicle proceeds straight ahead at the intersection including the first passing essential point. Then, as shown in FIG. 4, in order to arrive at the destination, the subject vehicle needs to make a left turn at the next intersection after traveling straight at the intersection including the first passing essential point. For this reason, the control device 110 calculates, as a second travel route, a route in which the subject vehicle travels straight ahead at an intersection including the first passing essential point and turns left from the east to the north at an intersection including the second passing essential point. In addition, the control device 110 sets the second passing essential point at the intersection after the subject vehicle has traveled straight at the intersection including the first passing essential point.

For example, in the example of FIG. 3, the passing essential point is set at the intersection, and the first travel route is a route in which the subject vehicle turns left at the intersection. The passing essential point is a point at which the subject vehicle needs to pass in order to travel along the travel route to the destination of the subject vehicle. When the passing essential point is set to the intersection, the second travel route is a route in which the subject vehicle travels in a direction different from the first travel route at the intersection including the passing essential point.

In step S8, the control device 110 calculates a first evaluation value as an index for determining whether or not to execute the overtaking of the preceding vehicle based on the detection information of the onboard device 200. The first evaluation value indicates a risk that the subject vehicle cannot return from the adjacent lane to the travel lane. In other words, the first evaluation value indicates a possibility that the subject vehicle cannot return from the adjacent lane to the travel lane after overtaking the preceding vehicle. The larger the first evaluation value, the greater the risk that the subject vehicle cannot return from the adjacent lane to the travel lane after overtaking the preceding vehicle, and the lower the possibility that the subject vehicle can return from the adjacent lane to the travel lane. The smaller the first evaluation value, the lower the risk that the subject vehicle cannot return from the adjacent lane to the travel lane after overtaking the preceding vehicle, and therefore the higher the possibility that the subject vehicle can return from the adjacent lane to the travel lane. The first evaluation value is calculated based on an arrival time from the current position of the subject vehicle to the target point. The target point is a passing essential point on the first travel route, a passing essential point common to the first travel route and the second travel route, a position distant by a predetermined distance from the passing essential point on the second travel route, or a passing essential point on the second travel route.

The control device 110 calculates the distance from the current position of the subject vehicle to the passing essential point, and calculates the arrival time to the passing essential point by dividing the calculated distance by the current vehicle speed of the subject vehicle. The longer the arrival time to the passing essential point, the longer the surplus time for the subject vehicle to return from the travel lane to the adjacent lane can be secured. Whether or not the subject vehicle can return from the adjacent lane to the travel lane is affected by the road condition on the travel lane after overtaking the preceding vehicle. For example, even when the arrival time for the subject vehicle to arrive at the passing essential point is long, if the road ahead of the preceding vehicle is congested by other vehicles, the subject vehicle cannot return to the travel lane after overtaking the preceding vehicle. For this reason, in the control processing of step S7, the control device 110 may calculate the first evaluation value by adding the road condition of the road ahead of the preceding vehicle to the arrival time to the passing essential point. For example, when the arrival time to the passing essential point is long, if the control device 110 detects, based on the road condition of the road ahead of the preceding vehicle, that other vehicles are stopped in line in the lane ahead of the preceding vehicle, the control device 110 calculates the first evaluation value so as to increase the first evaluation value. Note that the first evaluation value does not need to continuously decrease as the arrival time to the passing essential point increases. For example, the first evaluation value may gradually decrease as the arrival time to the passing essential point increases. The relationship between the arrival time to the passing essential point and the first evaluation value is set in advance, and the relationship is stored in the ROM or the like of the control device 110.

Note that the control device 110 may calculate the first evaluation value in accordance with the vehicle speed of the preceding vehicle in addition to the arrival time to arrive at the passing essential point. When the arrival time to the passing essential point is the same time, the time or distance for overtaking the preceding vehicle becomes longer as the vehicle speed of the preceding vehicle becomes higher. As a result, the margin time for the subject vehicle to return from the adjacent lane to the travel lane after overtaking the preceding vehicle becomes shorter. Therefore, the control device 110 may calculate the first evaluation value so that the first evaluation value increases as the vehicle speed of the preceding vehicle increases. The first evaluation value calculated by the control device 100 based on the arrival time to the first passing essential point is defined as $R_0$.

Further, the control device 110 sets a target point for calculating the first evaluation value ($R_1$) at an arbitrary position after passing through the first passing essential point in the second travel route. In the case of FIG. 4, since the second passing essential point is set to a position close to the first passing essential point, the control device 110 sets the second passing essential point to the target point for calculating the first evaluation value ($R_1$). The control device 110 calculates the arrival time to arrive at the second passing essential point, and calculates the first evaluation value ($R_1$) based on the calculated arrival time. For example, the first evaluation value is evaluated in three stages, and can be set to 0 point when the arrival time is long, 1 point when the arrival time is medium, and 2 points when the arrival time is short (when the arrival time is equal to or longer than the first predetermined value).

In step S9, the control device 110 calculates a shortening width (W) of the travel time shortened by overtaking the preceding vehicle. The control device 110 calculates the travel time to the passing essential point in the case of overtaking the preceding vehicle based on the travel distance from the current position of the subject vehicle to the passing essential point and the expected average vehicle speed in the case of overtaking the preceding vehicle. The expected average vehicle speed depends on the vehicle speed at the time of overtaking the preceding vehicle and the road condition ahead of the preceding vehicle. The road condition detected in the control flow of step S5 may be used. For example, when the arrival time to the passing essential point is long and it is detected from the road condition ahead of the preceding vehicle that other vehicles are stopped in line in the vicinity of the intersection, even if the subject vehicle overtakes the preceding vehicle, the shortening width (W) of the travel time is small. Therefore, the control device 110 specifies the road condition ahead of the preceding vehicle from the road condition ahead of the subject vehicle, and calculates the average vehicle speed from overtaking of the preceding vehicle to arriving at the passing essential point according to the specified road condition.

The control device 110 calculates the travel time to the passing essential point when the subject vehicle does not overtake the preceding vehicle, based on the travel distance from the current position of the subject vehicle to the passing essential point and the vehicle speed when the subject vehicle does not overtake the preceding vehicle. The vehicle speed when the subject vehicle does not overtake the preceding vehicle corresponds to the vehicle speed of the preceding vehicle. The control device 110 calculates the shortening width of the travel time shortened by the overtaking by subtracting the travel time when the subject vehicle overtakes the preceding vehicle from the travel time when the subject vehicle does not overtake the preceding vehicle. When the shortening width is a positive value, the travel time to the passing essential point is shortened by overtaking the preceding vehicle. On the other hand, when the shortening width is a negative value, the travel time to the passing essential point becomes longer by overtaking the preceding vehicle.

The control device 110 calculates the shortening width (W) of the travel time for each of the plurality of passing essential points. In the case of FIG. 4, the control device 110 calculates the shortening width ($W_0$) of the travel time to the first passing essential point. In addition, the control device 110 calculates the shortening width ($W_1$) of the travel time to the second passing essential point.

In step S10, the control device 110 calculates a time difference (T) due to the route change. The time difference is a time difference that increases by changing from the first travel route to the second travel route. The control device 110 calculates the time difference (T) by subtracting the travel time of the first travel route from the travel time of the second travel route. As the travel time of the first travel route and the travel time of the second travel route, the calculation result of the navigation device 230 may be used.

In step S11, the control device 110 calculates a second evaluation value (J) as an index for determining whether or not to overtake the preceding vehicle using the following Equation (1).

[Equation 1]

$$J_0 = W_0 - R_0 \quad (1)$$

The difference from the first evaluation value (R) is that, in the second evaluation value ($J_0$) when the subject vehicle travels in the first travel route, the shortening width of the travel time shortened by overtaking the preceding vehicle and the possibility that the subject vehicle can return from the adjacent lane to the travel lane after overtaking the preceding vehicle are added to the determination factor of whether or not to overtake the preceding vehicle. As expressed by the Equation (1), the control device 110 calculates the second evaluation value ($J_0$) by subtracting the first evaluation value ($R_0$) from the shortening width ($W_0$) of the travel time. The control device 110 calculates a second evaluation value ($J_0$) for each passing essential point. When calculating the second evaluation value ($J_0$), the control device 110 makes the shortening width ($W_0$) dimensionless and thereby matches the shortening width ($W_0$) to the first evaluation value ($R_0$). For example, the shortening width is evaluated in three stages. The shortening width can be set to 0 point when it is small, 1 point when it is medium, 2 points when the shortening width is large (when the shortening width is the second predetermined value or more).

Further, when the second travel route is set for one passing essential point, the control device 110 calculates the second evaluation value ($J_1$) when the subject vehicle travels in the second travel route using the following Equation (2).

[Equation 2]

$$J_1 = W_1 - R_1 - T \quad (2)$$

In the second evaluation value ($J_1$), the shortening width (W) of the travel time shortened by overtaking the preceding vehicle, the possibility ($R_1$) that the subject vehicle can return from the adjacent lane to the travel lane after overtaking the preceding vehicle, and the time difference (T) due to the change of the travel route are added to the determination factor of whether or not to overtake the preceding vehicle. As expressed by the Equation (2), the control device 110 calculates the second evaluation value ($J_1$) by subtracting the first evaluation value ($R_1$) and the time difference (T) due to the route change from the shortening width ($W_1$) of the travel time. When calculating the second evaluation value ($J_1$), the control device 110 makes the time difference (T) dimensionless and thereby matches the time difference (T) with the first evaluation value ($R_1$). For example, the time difference is evaluated in three stages. The time difference can be set to 0 point when it is small, 1 point when it is medium, 2 points when it is large.

In step S12, the control device 110 determines whether or not the second evaluation value ($J_0$) calculated using the Equation (1) is a positive value. When the second evaluation value ($J_0$) is a positive value, the control device 110 determines to overtake the preceding vehicle and executes overtaking control in step S14.

For example, in the case in which the subject vehicle overtakes the preceding vehicle, when there are few other vehicles traveling between the position of the preceding vehicle and the passing essential point, or when there are no other vehicles stopped in line between the position of the preceding vehicle and the passing essential point, the longer the travel distance from the subject vehicle to the passing essential point, the greater the shortening width (W) of the travel time. When the shortening width (W) is large, even when the risk that the subject vehicle cannot return from the adjacent lane to the travel lane is large to some extent, the Equation (1) for determination becomes a positive value. For example, when the three-stage evaluation is performed as described above, the score of the shortening width (W) is given as 2 points when the shortening width (W) is large. Therefore, when the first evaluation value is given as 2 points when the arrival time is long, 1 point when the arrival time is medium, and 0 point when the arrival time is short, the Equation (1) for determination is zero or less only when the arrival time is long as the first evaluation value. That is, in the system according to one or more embodiment of the present invention, when the shortening width (W) of the travel time shortened by overtaking is large (when the shortening width is equal to or more than the second predetermined value), even if there is a risk that the subject vehicle cannot return from the adjacent lane to the travel lane to some extent (when the first evaluation value is less than the first predetermined value), the control device 110 determines to overtake the preceding vehicle. As a result, the system according to one or more embodiment of the present invention can execute the overtaking control when the travel time is expected to be shortened by the overtaking.

On the other hand, when the shortening width (W) is small (when the shortening width is less than the second predetermined value), or when the risk that the subject vehicle cannot return from the adjacent lane to the travel lane is considerably larger than the shortening width (W), the Equation (1) for determination becomes a negative value. For example, when the three-stage evaluation is performed as described above, since the score of the shortening width (W) is given as 0 when the shortening width (W) is small, the Equation (1) for determination becomes zero or less regardless of whether the arrival time is long, medium, or short as the first evaluation value. At this point in time, the control device 110 does not determine to overtake the preceding vehicle. That is, when the time is not expected to be shortened by the overtaking, the system according to one or more embodiment of the present invention does not determine to overtake the preceding vehicle even when there is a high possibility that the subject vehicle can return from the adjacent lane to the travel lane after overtaking (when the first evaluation value is less than the first predetermined value). As a result, the system according to one or more embodiment of the present invention suppresses giving the passenger a sense of having performed an unnecessary overtaking.

When the second evaluation value ($J_0$) calculated using Equation (1) is 0 or less in the control process of step S12, the control device 110 determines whether or not the second evaluation value ($J_1$) calculated using Equation (2) is a positive value in step S13. When the second evaluation value ($J_1$) is a positive value, the control device 110 determines to overtake the preceding vehicle, and executes the overtaking control in step S14.

The control device 110 executes the overtaking control according to the following procedure. The control device 110 determines the presence or absence of other vehicles in the front and rear areas of the subject vehicle in the adjacent lane based on the road condition on the adjacent lane located on the right side of the traveling direction of the subject vehicle. When there is no other vehicle in the front and rear areas of the subject vehicle on the adjacent lane, the control device 110 determines that lane change is possible. The control device 110 outputs a control command for performing lane change to the vehicle controller 280. The subject vehicle moves from the travel lane to the adjacent lane. After the subject vehicle has overtaken the preceding vehicle or while the subject vehicle is overtaking the preceding vehicle, the control device 100 determines the presence or absence of other vehicles in the area ahead of the preceding vehicle on the travel lane based on the road condition on the travel lane located on the left side of the traveling direction of the subject vehicle (corresponding to the original travel lane before overtaking). Then, the control device 110 determines that the lane change is possible when there is no other vehicle in the area ahead of the preceding vehicle in the travel lane. The control device 110 outputs the control command for performing lane change to the vehicle controller 280. The subject vehicle moves from the adjacent lane to the travel lane.

When the second evaluation value ($J_1$) is equal to or less than zero in the determination process of step S13, the control device 110 determines not to execute the overtaking of the preceding vehicle, and does not execute the overtaking control in step S15.

The control flow of step S13 will be described with reference to FIG. 4. For example, when the shortening width ($W_0$) of the travel time to the first passing essential point is small, or when the risk ($R_0$) that the subject vehicle cannot return from the adjacent lane to the travel lane by the time the subject vehicle passes the first passing essential point is larger than the shortening width ($W_0$) of the travel time, the second evaluation value ($J_0$) calculated based on the Equation (1) becomes smaller than zero, and therefore, at this point, the control device 110 does not determine to overtake the preceding vehicle. In such a case, for example, when the shortening width ($W_1$) of the travel time to the second passing essential point ahead of the first passing essential point is large, and the risk ($R_0$) that the subject vehicle cannot return from the adjacent lane to the travel lane by the time the subject vehicle passes the second passing essential point is smaller than the shortening width ($W_1$) of the travel time, the second evaluation value ($J_1$) calculated based on the Equation (2) becomes a positive value. Then, the control device 110 determines to overtake the preceding vehicle. Before the subject vehicle reaches the first passing essential point, the overtaking control is executed. For example, if a three stages evaluation is performed as described above, a score of the shortening width (W) is given as 2 points when the shortening width (W) is large, and the score of the first evaluation value ($R_1$) is given as 1 point when the arrival time is medium. If there is no time difference (T) between the first travel route and the second travel route, the Equation (2) becomes a positive value. That is, even when the first evaluation value ($R_0$) is large and there is a high possibility that the subject vehicle cannot return from the adjacent lane to the travel lane by the time the subject vehicle passes the first passing essential point, when the shortening width ($W_1$) of the travel time to the second passing essential point is large, and when the risk ($R_0$) that the subject vehicle cannot return from the adjacent lane to the travel lane by the time the subject vehicle passes the second passing essential point is smaller than the shortening width ($W_1$) of the travel time, the subject vehicle moves from the travel lane to the adjacent lane in order to overtake the preceding vehicle by the overtaking control. When the subject vehicle cannot return from the adjacent lane to the travel lane by the time the subject vehicle passes the first passing essential point, the travel route of the subject vehicle is changed from the first travel route to the second travel route. Since the second evaluated value ($J_1$) calculated based on the Equation (2) is a positive value, it is expected that the travel time to the second passing essential point will be shortened due to the overtaking. Even when the subject vehicle does not return to the original travel lane after executing the overtaking, the subject vehicle travel in the second travel route. This prevent the travel time from becoming extremely long due to the route change.

Further, for example, when the shortening width ($W_0$) of the travel time to the first passing essential point is small, or when the risk ($R_0$) that the subject vehicle cannot return from the adjacent lane to the travel lane by the time the subject vehicle passes the first passing essential point is larger than the shortening width ($W_0$) of the travel time, the second evaluation value ($J_0$) calculated based on the Equation (1) becomes smaller than zero, so that the control device 110 does not determine to overtake the preceding vehicle at this point in time. In such a case, for example, when there is a low possibility that the subject vehicle cannot return from the adjacent lane to the travel lane by the time the subject vehicle passes the second passing essential point (i.e., when the first evaluation value ($R_2$) is low), the second evaluation value ($J_1$) calculated based on the Equation (2) becomes a positive value, and the control device 110 determines to overtake the preceding vehicle. Before the subject vehicle arrives at the first passing essential point, the control device 110 executes the overtaking control. For example, if the three-stage evaluation is performed as described above, the score of the shortening width (W) is given as 1 point when the shortening width (W) is medium, and the score of the first evaluation value ($R_1$) is given as 0 when the arrival time is short. If there is no time difference (T) between the first travel route and the second travel route, the Equation (2) becomes a positive value. That is, even when the first evaluation value ($R_0$) is large and there is the high possibility that the subject vehicle cannot return from the adjacent lane to the travel lane by the time the subject vehicle passes the first passing essential point, when the first evaluation value ($R_1$) is small and there is the low possibility that the subject vehicle cannot return from the adjacent lane to the travel lane by the time the subject vehicle passes the second passing essential point, the subject vehicle moves from the travel lane to the adjacent lane to overtake the preceding vehicle by the overtaking control. Even if the subject vehicle cannot return to the travel lane by the time the subject vehicle passes the first passing essential point, the subject vehicle returns to the travel lane by the time the subject vehicle passes the second passing essential point. This makes it possible to execute the overtaking control more safely or stably.

Further, for example, when the shortening width ($W_0$) of the travel time to the first passing essential point is small, or when the risk ($R_0$) that the subject vehicle cannot return from the adjacent lane to the travel lane by the time the subject vehicle passes the first passing essential point is larger than the shortening width ($W_0$) of the travel time, the second evaluation value ($J_0$) calculated based on the Equation (1) becomes smaller than zero, so that the control device 110 does not determine to overtake the preceding vehicle at this point in time. In such a case, when the travel time when the subject vehicle travels on the second travel route becomes longer than the travel time when the subject vehicle travels on the first travel route, the time difference (T) due to the change of the travel route becomes large, and the second evaluation value ($J_1$) calculated based on the Equation (2) becomes smaller than zero. As a result, the control device 110 determines not to overtake the preceding vehicle, and the control device 110 does not execute the overtaking control. Therefore, when the subject vehicle cannot return to the travel lane after overtaking the preceding vehicle, this prevent the travel time from being greatly lengthened by the route change.

In step S15, the control device 110 determines whether or not the subject vehicle has arrived at the destination based on the current position of the subject vehicle. When the subject vehicle arrives at the destination, the control flow shown in FIG. 2 ends. When the subject vehicle has not arrived at the destination, the control device 110 returns to step S1 and executes the control flow shown in FIG. 2.

Since the travel assistance device 100 according to one or more embodiment of the present invention is configured and operates as described above. The travel assistance method executed in the travel assistance device 100 and the onboard device 200 is executed as described above and has the following effects.

As described above, vehicle travel assistance method according to one or more embodiment of the present invention includes setting a travel lane in which a subject vehicle travels based on the detection information of a sensor equipped in the subject vehicle, identifying a preceding vehicle traveling ahead of the subject vehicle in the travel lane based on the detection information of the sensor, calculating the first evaluation value ($R_0$) based on the detection information, calculating the shortening width ($W_0$) of the travel time based on the vehicle speed of the subject vehicle and the vehicle speed of the traveling vehicle, and determining whether or not to overtake the preceding vehicle based on the first evaluation value ($R_0$) and the shortening width ($W_0$). As a result, this prevent unnecessary overtaking from being performed. The unnecessary overtaking is, for example, an overtaking in a scene in which the travel time is not shortened by overtaking although the subject vehicle can overtake the preceding vehicle and return to the travel lane.

Further, travel assistance method according to one or more embodiment of the present invention includes setting the first evaluation value to a smaller value as the possibility that the subject vehicle can return to the travel lane from the adjacent lane to the travel lane after overtaking the preceding vehicle is higher. Then, the travel assistance method determines not to overtake the preceding vehicle when the shortening width of the travel time shortened by overtaking the preceding vehicle is less than the second predetermined value. The travel assistance method determines to overtake the preceding vehicle when the shortening width is greater than or equal to the second predetermined value and the first evaluation value is less than the first predetermined value. As a result, this prevent the unnecessary overtaking from being performed since the overtaking control can be executed when the travel time is expected to be shortened by the overtaking of the preceding vehicle, and there is a high possibility that the subject vehicle can return to the travel lane after the overtaking.

Further, the vehicle travel assistance method according to one or more embodiment of the present invention includes calculating the first travel time in the case where the subject vehicle travels on the first travel route and the second travel time in the case where the subject vehicle travels on the second travel route, and determining whether or not to overtake the preceding vehicle based on the time difference between the travel times in the case where the travel route is changed to the second travel route from the first travel route. That is, in the case where the travel route of the subject vehicle is changed from the first traveling route to the second traveling route, the second evaluation value ($J_1$) becomes small when the time difference between the travel times is large, and therefore, the determination process for overtaking is executed in a direction in which the overtaking is prohibited. On the other hand, in the case where the travel route of the subject vehicle is changed from the first travel route to the second travel route, the second evaluation value ($J_1$) becomes large when the time difference of the travel time is small, and therefore, the determination process for overtaking is executed in the direction in which the overtaking is executed. As a result, when the subject vehicle cannot return to the travel lane, the overtaking control can be executed in consideration of the time increment due to the reroute, and therefore, this restrain an extra time required when the subject vehicle cannot return to the travel lane.

In addition, the travel assistance method according to one or more embodiment of the present invention includes calculating the second evaluation value ($P_1$) indicating whether or not to execute the overtaking by the calculation equation using the first evaluation value ($R_1$), the shortening width of the travel time ($W_1$), and the time difference (T) due to the route change, and executing the overtaking of the preceding vehicle when the second evaluation value ($P_1$) is equal to or larger than the predetermined evaluation threshold. As a result, a determination value of whether or not to overtake the preceding vehicle is calculated by a predetermined function, and a determination is performed whether or not to executing the overtaking of the preceding vehicle based on the evaluation value, so that whether or not to execute the overtaking can be determined by a consistent determination criterion. As a result, this can provide the passenger with travel based on a stable determination criterion, and suppress the sense of discomfort given to the passenger.

Further, the vehicle travel assistance method according to one or more embodiment of the present invention includes setting a passing essential point on the travel lane, and calculating a first evaluation value indicating a possibility that the subject vehicle can return from the adjacent lane to the travel lane by the time the subject vehicle passes the passing essential point after the subject vehicle overtakes the preceding vehicle. As a result, this prevent unnecessary overtaking from being performed.

Further, the vehicle travel assistance method according to one or more embodiment of the present invention includes setting a passing essential point on the travel lane, and calculating a first evaluation value ($R_1$) indicating the possibility that the subject vehicle can return from the adjacent lane to the travel lane by the time the subject vehicle passes the passing essential point. The second evaluation value ($J_2$) when there is a low possibility that the subject vehicle can return from the adjacent lane to the travel lane by the time the subject vehicle passes the essential passing point and the time difference (T) is shorter than the predetermined value is larger than the second evaluation value ($J_2$) when there is the low possibility that the subject vehicle can return from the adjacent lane to the travel lane by the time the subject vehicle passes the essential passing point and the time difference (T) is longer than the predetermined value. As a result, even if the subject vehicle cannot return to the original travel lane by the time the subject vehicle passes the passing essential point after executing the overtaking, a determination to overtake the preceding vehicle can be performed when the subject vehicle can travel along the travel route of the reroute. As a result, on the entire travel route, the subject vehicle can safely and stably travel.

Further, the travel assistance method according to the modification of the present embodiment may correct the second evaluation value ($J_2$) by the following factors when calculating the second evaluation value ($J_2$).

For example, when the travel distance from the subject vehicle to the destination is shorter than the predetermined distance, the control device 110 sets the second evaluation value ($J_2$) smaller than the second evaluation value ($J_2$) when the travel distance is longer than the predetermined distance, and thereby corrects the second evaluation value ($J_2$) so as not to determine that the subject vehicle can overtake the preceding vehicle. When the destination is distant, the travel time can be restrained from increasing by adjusting the travel route of the route change. However, when the destination is close, the number of adjustable routes is limited, and therefore the possibility that the travel time becomes longer due to the route change increases. In the vehicle travel assistance method according to the modification, when the travel distance to the destination is shorter than the predetermined distance, it is difficult to execute the overtaking control, and therefore, this restrain the travel time from increasing.

As another example, the control device 110 sets the second evaluation value ($J_2$) when the second travel route includes a highway larger than the second evaluation value ($J_2$) when the second travel route does not include a highway, and thereby corrects the second evaluation value ($J_2$) so as to determine that the subject vehicle can overtake the preceding vehicle. When the second travel route includes a highway, the time difference (T) of the travel time due to the route change is short, and there is the low possibility that the travel time becomes long due to the route change. As a result, by executing the overtaking in the entire travel route, this can give a sense of time shortening to the passenger. When the route calculation mode in the navigation device 230 is set to the general priority mode or the eco mode, when calculating the second travel route, the mode setting condition may be removed and the route in which the subject vehicle passes through the highway may be preferentially calculated. In the general priority mode, a route in which that the subject vehicle does not pass through a highway but preferentially passes through a general road is preferentially calculated. In the eco mode, a route in which the subject vehicle consumes less energy is preferentially calculated.

As another example, the control device 110 sets the second evaluation value ($J_2$) when the second travel route deviates from the automatic drivable area smaller than the second evaluation value ($J_2$) when the second travel route does not deviate from the automatic drivable area, and thereby corrects the second evaluation value ($J_2$) so as not to determine that the subject vehicle can overtake the preceding vehicle. As a result, this can restrain the automatic operation from being interrupted, so that it is possible to lengthen the time for executing the automatic operation.

Further, in the travel assistance method according to another modification of the present embodiment, when the speed difference between the preceding vehicle and the own vehicle is equal to or less than a predetermined speed threshold, the travel assistance method may execute the overtaking control of the preceding vehicle regardless of the determination result of whether or not to overtake the preceding vehicle based on the first assessment value ($R_0$) and the shortened range ($W_0$). That is, when the vehicle speed of the preceding vehicle is extremely small, the travel time becomes extremely long when the preceding vehicle is followed. In the travel assistance method according to the modified example, when the vehicle speed of the preceding vehicle is extremely low with respect to the vehicle speed of the own vehicle, the overtaking control is executed, so that the sense of discomfort given to the occupant can be suppressed.

The travel assistance device 100 according to one or more embodiment of the present invention has the same operation and effects as those of the travel assistance method described above.

It should be noted that the above-described embodiments have been described in order to facilitate understanding of the present invention, and are not described in order to limit the present invention. It is therefore intended that the elements disclosed in the above embodiments include all design changes and equivalents to fall within the technical scope of the present invention.

EXPLANATIONS OF LETTERS OR NUMERALS

100 . . . Travel assistance device
110 . . . Control device
111 . . . Processor
120 . . . Recording device
130 . . . Communication device
200 . . . On-board device
210 . . . Communication device
220 . . . Detection device
221 . . . Camera
222 . . . Radar device
230 . . . Navigation device
231 . . . Position detecting device
232 . . . Recording device
240 . . . Recording device
241 . . . Map information
242 . . . Lane information
243 . . . Traffic rule information
250 . . . Output device
251 . . . Display
252 . . . Speaker
260 . . . Vehicle Sensor
261 . . . Steering angle sensor
262 . . . Vehicle speed sensor
263 . . . Attitude sensor
270 . . . Lane keeping device
280 . . . Vehicle controller
290 . . . Driving device
295 . . . Steering device

The invention claimed is:

1. A vehicle travel assistance method executed by a processor, comprising:
   setting a travel lane in which a subject vehicle travels based on detection information of a sensor equipped in the subject vehicle;
   identifying a preceding vehicle traveling ahead of the subject vehicle in the travel lane based on the detection information of the sensor;
   calculating, based on the detection information of the sensor, a first evaluation value indicating a possibility that the subject vehicle can return to the travel lane from an adjacent lane adjacent to the travel lane after overtaking the preceding vehicle;
   calculating a shortening width of travel time shortened by overtaking the preceding vehicle based on a vehicle speed of the subject vehicle and a vehicle speed of the preceding vehicle;

calculating a shortening width evaluation value comparable to the first evaluation value according to the shortening width;
comparing the first evaluation value with the shortening width evaluation value; and
determining whether or not to overtake the preceding vehicle based on a result of comparison.

2. The vehicle travel assistance method according to claim 1, comprising:
calculating a second evaluation value indicating whether or not to execute an overtaking based on a formula including the first evaluation value and the shortening width evaluation value; and
determining to overtake the preceding vehicle when the second evaluation value is a predetermined value or more.

3. The vehicle travel assistance method according to claim 2, wherein the second evaluation value is calculated by subtracting the first evaluation value from the shortening width evaluation value.

4. The vehicle travel assistance method according to claim 3, wherein the first evaluation value is set to a smaller value as the possibility is higher.

5. The vehicle travel assistance method according to claim 3, wherein the shortening width evaluation value is set to a greater value as the shortening width is greater.

6. The vehicle travel assistance method according to claim 1, comprising:
setting the first evaluation value to a smaller value as the possibility is higher;
determining not to execute the overtaking of the preceding vehicle when the shortening width is less than a second predetermined value; and
determining to execute the overtaking of the preceding vehicle when the shortening width is equal to or greater than the second predetermined value and the first evaluation value is less than a first predetermined value.

7. The vehicle travel assistance method according to claim 1, comprising:
calculating a first travel route when the subject vehicle can return to the travel lane from the adjacent lane after the subject vehicle has overtaken the preceding vehicle and before the subject vehicle arrives at a predetermined target point;
calculating a second travel route when the subject vehicle cannot return to the travel lane from the adjacent lane after the subject vehicle has overtaken the preceding vehicle and before the subject vehicle arrives at the predetermined target point;
calculating a first travel time when the subject vehicle travels on the first travel route and a second travel time when the subject vehicle travels on the second travel route; and
determining whether or not to overtake the preceding vehicle based on a time difference between the travel times when the subject vehicle changes the travel route from the first travel route to the second travel route.

8. The vehicle travel assistance method according to claim 7, comprising:
calculating a second evaluation value indicating whether or not to execute the overtaking of the preceding vehicle by a calculation formula including the first evaluation value, the shortening width, and the time difference; and
executing the overtaking of the preceding vehicle when the second evaluation value is equal to or greater than a predetermined evaluation threshold.

9. The vehicle travel assistance method according claim 1, comprising:
setting a passing essential point in the travel lane; and
calculating the first evaluation value indicating the possibility that the subject vehicle can return to the travel lane from the adjacent lane before the subject passes the passing essential point after the subject vehicle has overtaken the preceding vehicle.

10. The vehicle travel assistance method according to claim 8, comprising:
setting a passing essential point in the travel lane included in the first travel route; and
calculating the first evaluation value indicating the possibility that the subject vehicle can return to the travel lane from the adjacent lane before the subject vehicle passes the passing essential point after the subject vehicle has overtaken the preceding vehicle;
wherein the second evaluation value when there is low possibility of the subject vehicle returning to travel lane from the adjacent lane by the passing essential point and the time difference is shorter than a predetermined value is greater than the second evaluation value when there is the low possibility and the time difference is longer than the predetermined value.

11. The vehicle travel assistance method according to claim 8, wherein the second evaluation value when a travel distance from the current position of the subject vehicle to the destination is shorter than a predetermined distance is smaller than the second evaluation value when the travel distance is longer than the predetermined distance.

12. The vehicle travel assistance method according to claim 8, wherein the second evaluation value when the second travel route includes a highway is greater than the second evaluation value when the second travel route does not include the highway.

13. The vehicle travel assistance method according to claim 8, wherein the second evaluation value when the second travel route deviates from the automatic drivable area is smaller than the second evaluation value when the second travel route does not deviate from the automatic drivable area.

14. The vehicle travel assistance method according to claim 1, comprising:
executing the overtaking of the preceding vehicle when a speed difference between the preceding vehicle and the subject vehicle is equal to or less than a predetermined speed difference threshold value, regardless of the determination result of whether or not to execute the overtaking of the preceding vehicle based on the first evaluation value and the shortening width.

15. A travel assistance device comprising: a sensor equipped in a subject vehicle; and a processor for executing a control process for supporting the travel of the subject vehicle, the processor is configured to:
set a travel lane in which the subject vehicle travels based on detection information of the sensor;
identify a preceding vehicle traveling ahead of the subject vehicle in the travel lane based on the detection information of the sensor;
calculate, based on the detection information, a first evaluation value indicating a possibility that the subject vehicle can return to the travel lane from an adjacent lane adjacent to the travel lane after overtaking the preceding vehicle;

calculate a shortening width of travel time shortened by overtaking the preceding vehicle based on a vehicle speed of the subject vehicle and a vehicle speed of the preceding vehicle;
calculate a shortening width evaluation value comparable to the first evaluation value according to the shortening width;
compare the first evaluation value with the shortening width evaluation value; and
   determine whether or not to overtake the preceding vehicle based on a result of comparison.

\* \* \* \* \*